US011102079B2

(12) United States Patent
Nahar et al.

(10) Patent No.: US 11,102,079 B2
(45) Date of Patent: Aug. 24, 2021

(54) CROSS-REGIONAL VIRTUAL NETWORK PEERING

(71) Applicant: Microsoft Technology Licensing, LLC, Redmond, WA (US)

(72) Inventors: Anavi Arun Nahar, Seattle, WA (US); David M. Brumley, Bellevue, WA (US); Harish Kumar Chandrappa, Bothell, WA (US); Neeraj Motwani, Redmond, WA (US); Nisheeth Srivastava, Sammamish, WA (US); Rishabh Tewari, Redmond, WA (US); Vaibhav Kumar, Bellevue, WA (US); Vishal Taneja, Seattle, WA (US); Vladimir Serov, Redmond, WA (US); Xinyan Zan, Sammamish, WA (US); Deepak Bansal, Bellevue, WA (US); Narayan Annamalai, Sammamish, WA (US); Milan Dasgupta, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 15/955,491

(22) Filed: Apr. 17, 2018

(65) Prior Publication Data

US 2019/0319847 A1    Oct. 17, 2019

(51) Int. Cl.
| | | |
|---|---|---|
| *H04L 12/24* | | (2006.01) |
| *H04L 29/12* | | (2006.01) |
| *H04L 12/46* | | (2006.01) |
| *H04L 29/08* | | (2006.01) |
| *H04L 12/715* | | (2013.01) |

(52) U.S. Cl.
CPC .......... *H04L 41/12* (2013.01); *H04L 12/4633* (2013.01); *H04L 61/2592* (2013.01); *H04L 61/6059* (2013.01); *H04L 45/64* (2013.01); *H04L 67/10* (2013.01)

(58) Field of Classification Search
CPC . H04L 61/6059; H04L 61/2592; H04L 45/64; H04L 12/4633
See application file for complete search history.

(56) References Cited

U.S. PATENT DOCUMENTS

| | | | |
|---|---|---|---|
| 8,312,129 | B1 | 11/2012 | Miller et al. |
| 9,584,328 | B1* | 2/2017 | Graham-Cumming ...................... H04L 61/6059 |
| 9,780,965 | B2 | 10/2017 | Huynh Van et al. |

(Continued)

FOREIGN PATENT DOCUMENTS

WO    2017214883 A1    12/2017

OTHER PUBLICATIONS

P. Garg and Wang, "NVGRE: Network Virtualization Using Generic Routing Encapsulation", Sep. 2015, IETF, https://tools.ietf.org/html/rfc7637, pp. 1-17. (Year: 2015).*

(Continued)

*Primary Examiner* — Nam T Tran
(74) *Attorney, Agent, or Firm* — Newport IP, LLC; Han Gim (57) ABSTRACT

Virtual networks located in different regions of cloud provider are peered using unique regional identifiers for the virtual networks. The regional identifiers and other information are pushed down a network management stack to implement the peering.

20 Claims, 6 Drawing Sheets

(56) References Cited

U.S. PATENT DOCUMENTS

| | | | | |
|---|---|---|---|---|
| 9,807,057 B1* | 10/2017 | Deb | ............... | H04L 61/2592 |
| 10,498,693 B1* | 12/2019 | Strauss | ............... | H04L 61/2592 |
| 2005/0041671 A1* | 2/2005 | Ikeda | ............... | H04L 61/6059 |
| | | | | 370/395.52 |
| 2013/0058346 A1 | 3/2013 | Sridharan et al. | | |
| 2013/0142201 A1 | 6/2013 | Kim et al. | | |
| 2014/0301391 A1 | 10/2014 | Krishnan et al. | | |
| 2018/0324247 A1* | 11/2018 | Hood | ............... | H04L 12/46 |
| 2019/0007366 A1* | 1/2019 | Voegele | ............... | H04L 12/4633 |
| 2019/0097940 A1* | 3/2019 | Cheng | ............... | H04L 67/10 |

OTHER PUBLICATIONS

Dial, et al., "Azure Virtual Network Peering—Microsoft Docs", Retrieved From: https://web.archive.org/web/20180407140321/https://docs.microsoft.com/en-us/azure/virtual-network/virtual-network-peering-overview, Mar. 26, 2018, 5 Pages.

"International Search Report and Written Opinion Issued in PCT Application No. PCT/US2019/025266", dated Jul. 9, 2019, 13 Pages.

"Announcing Support for Inter-Region VPC Peering", Retrieved from: <<https://aws.amazon.com/about-aws/whats-new/2017/11/announcing-support-for-inter-region-vpc-peering/>>, Nov. 29, 2017, 4 Pages.

Annamalai et al., "Virtual Network Peering", Retrieved from: <<https://docs.microsoft.com/en-us/azure/virtual-network/virtual-network-peering-overview>>, Sep. 25, 2017, 29 Pages.

\* cited by examiner

CROSS-REGIONAL VIRTUAL NETWORK PEERING

BACKGROUND

Large-scale networked systems are commonplace platforms employed in a variety of settings for running applications and maintaining data for business and operational functions. For instance, a data center (e.g., physical cloud computing infrastructure) may provide a variety of services (e.g., web applications, email services, search engine services, etc.) for a plurality of customers simultaneously. These large-scale networked systems typically include a large number of resources distributed throughout one or more data centers which may be located in one or more geographical regions, and may be implemented by a cloud provider providing cloud services to customers.

The implementation of connections between endpoints of remote networks in these large-scale networked systems is often rooted in physical connectivity, but there is an emerging trend toward virtualizing connectivity. One instance of virtualizing connectivity includes a virtualized network which may involve creating a logical isolation of cloud resources dedicated to a customer's cloud service. The virtualized network may enable cloud resources, including physical machines or virtual machines, that are assigned to a customer to securely communicate with each other and be isolated from other customer virtualized networks.

A virtualized network may connect to another virtualized network or to an on-premises network of a customer through the Internet or private networks. A gateway may be used to securely provide the connections between the virtualized networks or to the on-premises network. One type of gateway may use virtual private network (VPN) technology, such as Internet Protocol Security (IPsec)/Internet Key Exchange (IKE) VPN tunnels, to send encrypted traffic across a public connection to an on-premises location or to send encrypted traffic between virtualized networks over the cloud provider's network.

The gateway may be beneficial to provide secure connections. However, the gateway may become a bottleneck point. For example, a gateway may have bandwidth constraints that can limit the amount of traffic it can send or receive at any given time. As a result, customers that utilize cloud services may not able to push a significant amount of data needed for their organizations through the gateway, and may not be able to execute real-time applications that require exchanging a large amount of data due to latency caused by bandwidth constraints of the gateway.

BRIEF DESCRIPTION OF DRAWINGS

Embodiments and examples are described in detail in the following description with reference to the following figures. The embodiments are illustrated by examples shown in the accompanying figures in which like reference numerals indicate similar elements.

DETAILED DESCRIPTION

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

According to an embodiment of the present disclosure, global virtual network peering facilitates communication between virtual networks which may be located in different geographical regions. The global virtual network peering may impose no additional bandwidth restrictions on communications between virtual networks and thus minimizes latency for the communications. Through use of the global virtual network peering, customers are able to communicate from a VM in one region to a VM in another region directly without the use of a gateway or an extra hop in-between. Furthermore, large customers of a cloud provider may have multi-region deployments in the cloud and often need to be able to communicate across geographical regions with high bandwidth and low latency, such as for data replication through private internet protocol (IP) addresses, and disaster recovery. Global virtual network peering provides secured global connectivity for VMs across the regions with high performance. In addition, private, cross-regional connectivity through Internet Protocol version 6 (IPv6) or another IP version may be employed on the cloud provider backbone to provide enhanced IP-based security for cross-regional connectivity. For example, IPv6 prefixes may be used to distinguish IP regions in different regions. Use of IPv6 for global virtual network peering enables more efficient routing, more efficient routing packet processing, directed data flows, simplified network configurations, and IP Security (Sec). However, IP versions, other than IPv6, may be used for global virtual network peering as long as regional identifiers may be used in the header.

Figure 1:
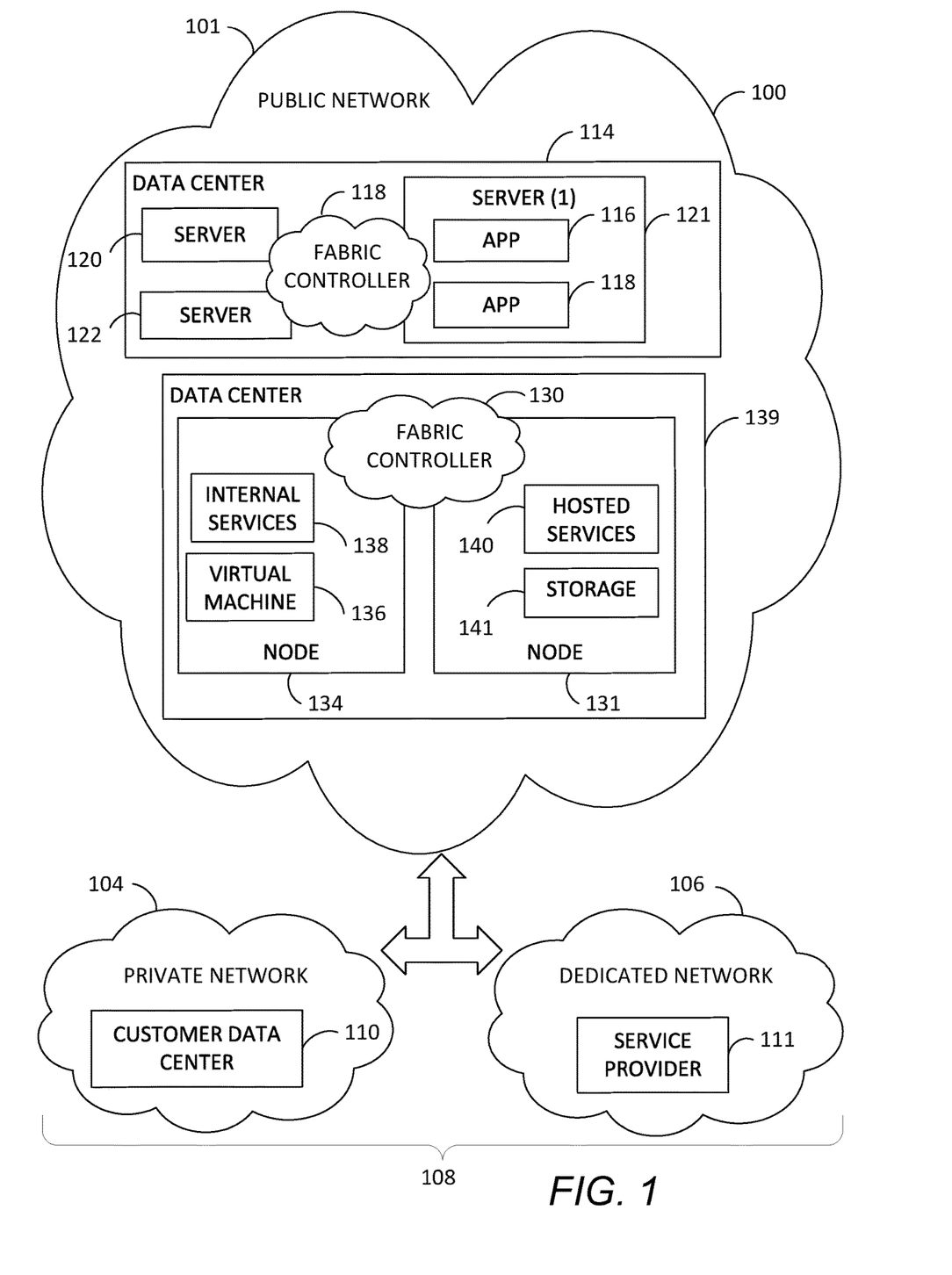
FIG. 1 shows an example of an architecture of a distributed computing environment, according to an embodiment.

FIG. 1 shows an example of an architecture 100 of a distributed computing environment, which may be a cloud computing environment. The distributed computing environment may employ global virtual network peering. Architecture 100 should not be interpreted as having any dependency or requirement related to any single component or combination of components illustrated therein. Also, any number of nodes, virtual machines, data centers, role instances, or combinations thereof may be employed to achieve the desired functionality within the scope of embodiments of the present disclosure.

The distributed computing environment of FIG. 1 includes a public network 101, a private network 104, and a dedicated network 106. Public network 101 may be a public cloud. Microsoft Azure™ is an example of a public cloud, and other companies also provide public clouds that make cloud services available to customers. Private network 104 may be a private enterprise network or private cloud, while dedicated network 106 may be a third-party network or dedicated cloud. In this example, private network 104 may host a customer data center 110, and dedicated network 106 may host an internet service provider 111. Hybrid cloud 108 may include any combination of public network 101, private network 104, and dedicated network 106. For example, dedicated network 106 may be optional, with hybrid cloud 108 comprised of public network 101 and private network 104.

Public network 101 may include data centers configured to host and support operations. It may be understood and appreciated that data center 114 and data center 139 shown in FIG. 1 are an example of one implementation for accommodating one or more applications and is not intended to suggest any limitation as to the scope of use or functionality of embodiments and examples of the present disclosure. Neither should data center 114 and data center 139 be interpreted as having any dependency or requirement related to any single resource, combination of resources, combination of servers (e.g., servers 120-121) combination of nodes (e.g., nodes 131 and 134), or set of application program interfaces (APIs) to access the resources, servers, and/or nodes.

Data center 114 illustrates a data center comprising a plurality of servers, such as servers 120-122. A fabric controller 130 is responsible for automatically managing the servers 120-122 and distributing tasks and other resources within the data center 114. By way of example, the fabric controller 130 may rely on a service model (e.g., designed by a customer that owns the modular-application) to provide guidance on how, where, and when to configure a server and how, where, and when to place an application, such as applications 116 and 118, on a server. In one embodiment, one or more role instances of a modular-application may be placed on one or more of the servers of data center 114, where the one or more role instances may represent the portions of software, component programs, or instances of roles describing operations to be performed by the modular-application.

Data center 139 illustrates a data center comprising a plurality of nodes, such as node 131 and node 134. One or more virtual machines may run on nodes of data center 139, such as virtual machine 136 of node 134 for example. Although FIG. 1 depicts a single virtual node on a single node of data center 139, any number of virtual nodes may be implemented on any number of nodes of the data center in accordance with illustrative embodiments of the disclosure. Generally, virtual machine 136 may be allocated to role instances of a modular-application, or service application, based on demands (e.g., amount of processing load) placed on the modular-application. As used herein, the phrase "virtual machine" is not meant to be limiting, and may refer to any software, application, operating system, or program that is executed by a processing unit. A virtual machine may perform the functionality of a role instance allocated thereto. The virtual machine 136 may include processing capacity, storage locations, and other assets within the data center 139 to properly support the allocated role instances.

In operation, the virtual machines are dynamically assigned resources on a first node and second node of the data center, and endpoints (e.g., the role instances) are dynamically placed on the virtual machines to satisfy the current processing load. In one instance, a fabric controller 130 is responsible for automatically managing the virtual machines running on the nodes of the data center 139 and for placing the role instances and other resources (e.g., software components) within the data center 139. By way of example, the fabric controller 130 may rely on a service model (e.g., designed by a customer that owns the service application) to provide user interface on how, where, and when to configure the virtual machines, such as virtual machine 136, and how, where, and when to place the role instances thereon.

As discussed above, the virtual machines may be dynamically established and configured within one or more nodes of a data center. As illustrated herein, node 131 and node 134 may be any form of computing devices, such as, for example, a personal computer, a desktop computer, a laptop computer, a mobile device, a consumer electronic device, server(s), and the like. In one instance, the nodes host and support the operations of the virtual machines, while simultaneously hosting other virtual machines carved out for supporting other tenants of the data center 139, such as internal services 138 and hosted services 140. Often, the role instances may include endpoints of distinct service applications owned by different customers. The data centers may include storage 141 for storing any information.

Typically, each of the nodes includes, or is linked to, some form of a computing unit (e.g., a central processing unit, microprocessor, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor (not shown) coupled to the computer readable medium (e.g., computer storage media and communication media) accommodated by each of the nodes.

The role instances that reside on the nodes support the operation of service applications and may be interconnected via APIs. In one instance, one or more of these interconnections may be established via a network cloud, such as public network 101. The network cloud serves to interconnect resources, such as the role instances, which may be distributable placed across various physical hosts, such as nodes 131 and 134. Also, the network cloud facilitates communication over channels connecting the role instances of the service applications running in the data center 139. By way of example, the network cloud may include, without limitation, one or more local area networks (LANs) and/or wide area networks (WANs). Such networking environments are commonplace in offices, enterprise-wide computer networks, intranets, and the internet. Accordingly, the network is not further described herein.

Figure 2:
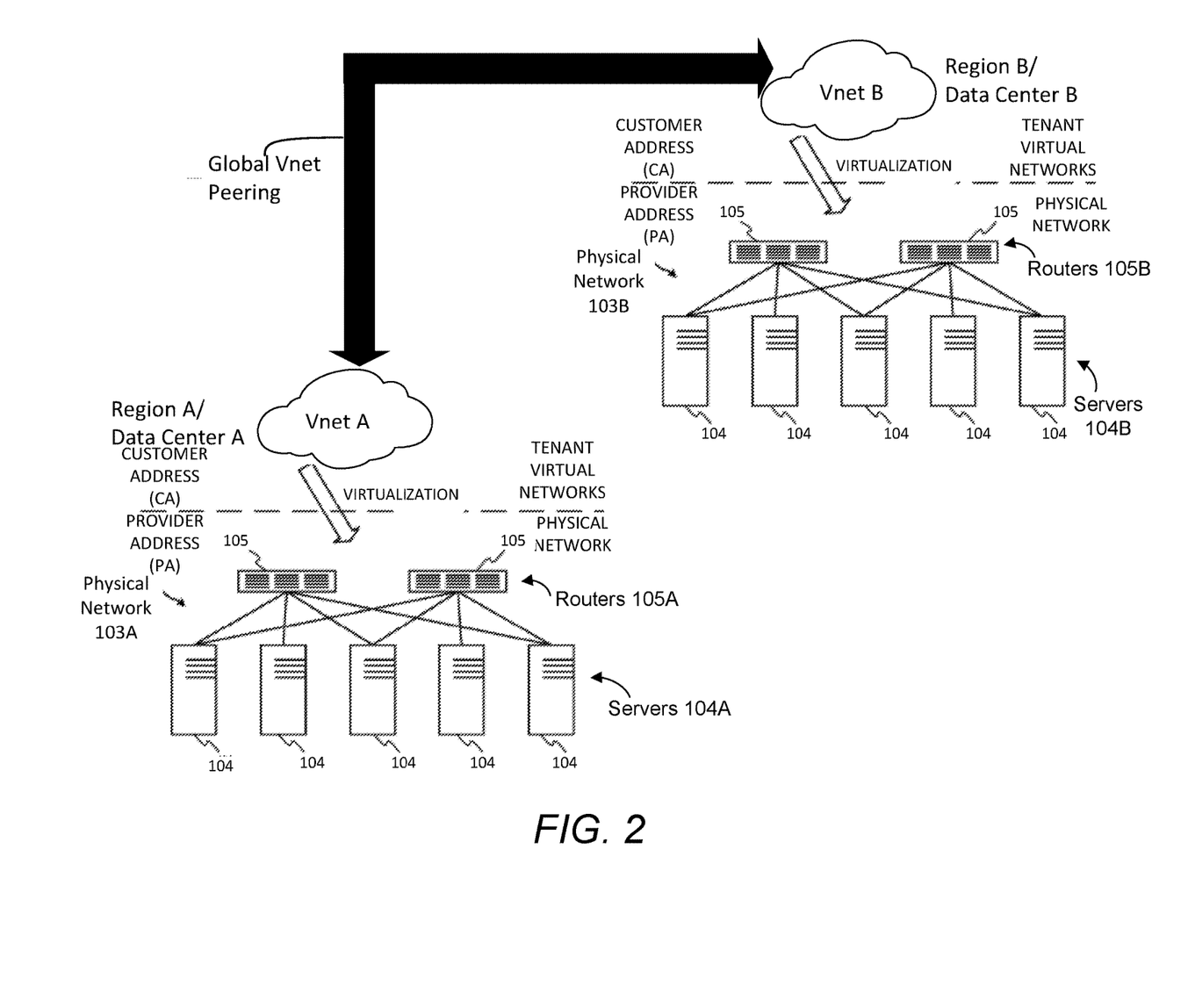
FIG. 2 shows an example of virtual networks that be implemented in different geographical regions in a public cloud, according to an embodiment.

FIG. 2 shows an example of virtual networks that be implemented in different geographical regions in a cloud 101. FIG. 2 illustrates a tenant or customer of the cloud having networks deployed in multiple geographical regions, such as region A and region B in data centers A and B respectively, of the cloud. The customer has a virtual network A in region A and virtual network B in region B. A virtual network is shown as VNET in FIG. 2. The virtual networks A-B run on physical networks 103A-B in data centers A-B. The physical networks 103A-B may include a plurality of physical servers 104A-B interconnected by physical routers 105A-B. Each virtual network A, B has the illusion that it is running as an independent physical network with its own address space.

A virtual network may include a logical isolation of the cloud resources dedicated to the customer's subscription. The virtual network may be connected to other virtual networks, or to an on-premise network of the customer. A virtual network may be created by mapping a customer address space of resources in the virtual network to a physical address space of the physical resources supporting the virtual network. For example, each VM in the virtual network is given two IP addresses: one IP address—the Customer Address (CA)—is visible in the virtual network and is relevant in the context of a given virtual subnet in the virtual network; and the other IP address—the Provider Address (PA)—is relevant in the context of the physical network in the cloud datacenter. The PA may also be referred to as a physical address in a physical address space of the provider network, such as an IPv6 address of a host. A subnet of a virtual network may include a subset of the customer addresses of the customer address space of the virtual network. The decoupling of the tenant and datacenter IP addresses provides many benefits. One benefit is that a tenant can move their network and subnets to VMs in the cloud without modifying the physical network configuration and without worrying about what other tenants or virtual networks are present in that datacenter. Another benefit is policy enforcement in the VM hosts, which provides a scalable solution for multi-tenant isolation. Also, a VM may be migrated to a new physical host without requiring notification to the customer. In other words, because each VM in the virtual network has two IP addresses, the IP address that is relevant in the datacenter context—i.e., the Physical Address—can be changed without needing to change the IP address that is in the VM—i.e., the Customer Address. Therefore, when a client is talking to the VM via the CA, the client is unaware that the VM has physically moved to a different subnet. Additionally, using distributed routing domains, the VM is unaware that its IP address has been virtualized. From the VM's perspective, all communication is occurring via the CA IP address.

The virtual networks A-B may be connected through global virtual network peering as is further described below. It should be understood that connecting the virtual networks A-B through global virtual network peering may include connecting subnets in the virtual networks A-B through global virtual network peering.

Figure 3:
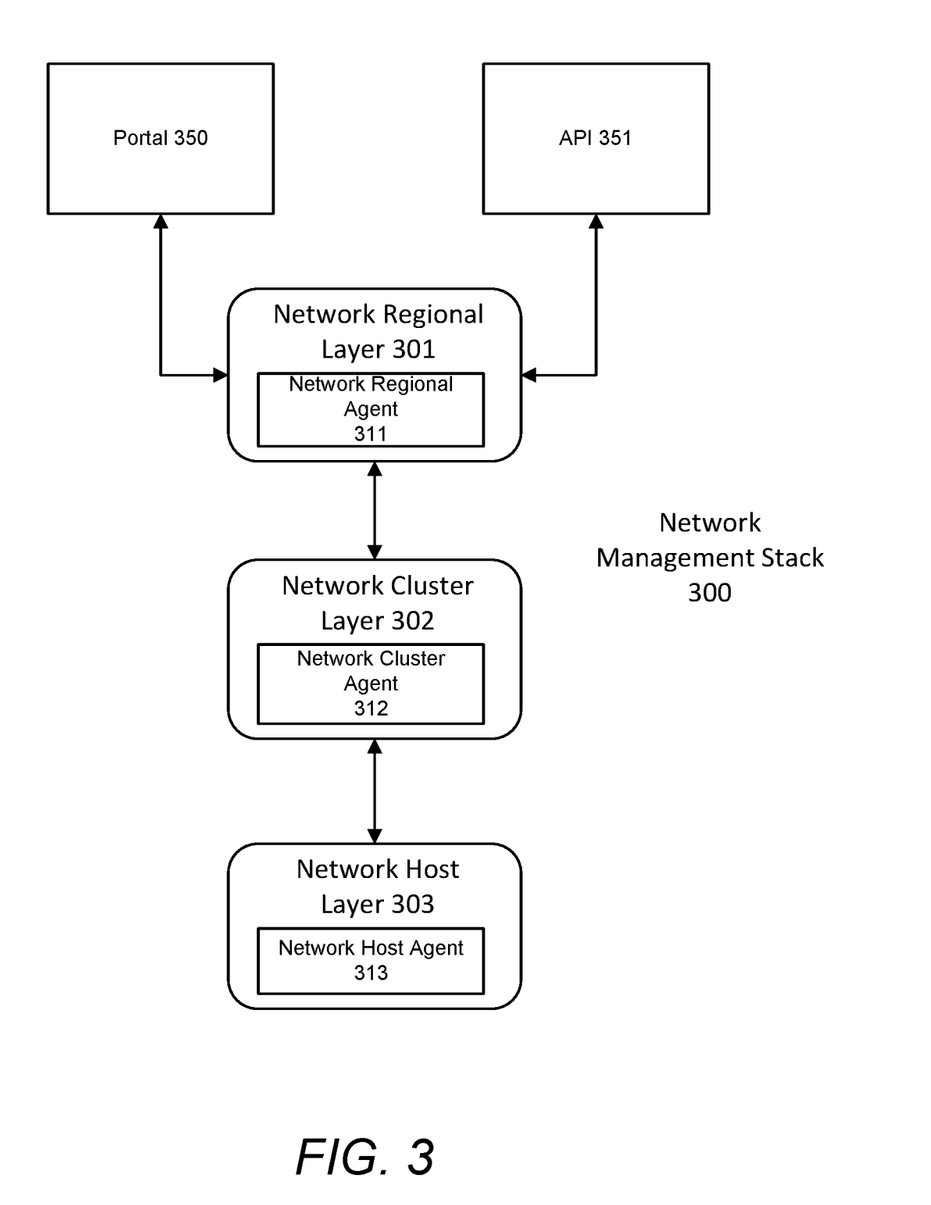
FIG. 3 shows an example of a network management stack for the cloud provider, according to an embodiment.

FIG. 3 shows an example of a network management stack 300 for the cloud provider. The network management stack 300 is a hierarchical representation of layers of network management components that may be used in a cloud, such as the public cloud shown in FIGS. 1-2, to manage aspects of networking for virtual and physical networks of the cloud. Some examples of capabilities of the network management stack 300 include connectivity between network stack resources, such as connecting networking resources together in a secure, private virtual network in the cloud. The network management stack 300 can provide Internet connectivity to communicate to and from network resources over the Internet, such as through a virtual private network (VPN) over the Internet, or through a dedicated connection. The network management stack 300 may provide load balancing for servers, and may provide security, such as filtering network traffic between subnets or virtual machines (VMs). The network management stack 300 may provide routing, including default routing or controlled routing. The network management stack 300 may also provide network manageability, such as monitoring and managing networking resources. The network management stack 300 may also include deployment and configuration tools, which may use a web-based portal or cross-platform command-line tools to deploy and configure network resources.

The network management stack 300 includes network regional layer (NRL) 301 for managing network resources at the regional level, including network resources for virtual networks deployed in a region. The NRL 301 may include a network regional agent (NRA) 311 comprising deployment and configuration tools that allow a customer to manage their network resources for an entire region. For example, the cloud provider may provide network resources, such as NICs, public IP addresses, and VMs, that are located in a data center in a particular geographic region. These network resources may be managed independently or collectively by the customer through the NRA 311 using a region ID and other regional information for the network resources. The cloud provider may have network resources in multiple regions and each region may have a region name, such as "West US", "East US", etc. A virtual network for a customer may be created in a particular region, and the NRA 311 may associate and store a VNET ID and region ID (e.g., region name) for a virtual network created in a particular region. Also, the NRA 311 may store a source IPv6 prefix for the region. For example, IPv6 prefixes are used to uniquely identify the regions of the cloud provider. The NRA 311 may store, along with the VNET ID and the region ID, the IPv6 prefix that uniquely identifies the region. The NRA 311 may also receive parameters and instructions for the network resources via a customer portal 350 or API 351. The parameters may specific various properties for the network resources, such as tags, network security groups, etc., and the instructions may include instructions for managing the network resources, such as assigning the network resources to an application, creating virtual networks, specifying virtual subnets to connect through global virtual network peering, etc. The NRA 311 may also provide administrative information through the portal 350 or API 351, such as alerts for specific network monitoring metrics.

The NRA 311 manages network resources on a regional basis for virtual networks. For example, a virtual network may be created in a region. Virtual machines can use virtual networks that are in the same region. However, a virtual machine can't be part of a virtual network that's in a different region, which is enforced by the NRA 311. Other regional-based management of virtual networks may also be performed by the NRA 311.

The network management stack 300 includes network cluster layer (NCL) 302, which may include a network cluster agent (NCA) 312 that manages network resources and network state provisioning. The NCL 302 enables networking scenarios like virtual networks, load balancing, and Quality of Service (QoS) at the cluster level. A cluster may include VMs (nodes) that run on groups of physical servers known as "clusters" (e.g., of approximately 1,000 machines). Each cluster may be independently managed by a scaled-out and redundant platform fabric controller (FC) software component. For example, an FC manages the lifecycle of VMs and applications running in its cluster, including provisioning and monitoring the health of the hardware under its control. The FC executes both automatic operations, like healing VM instances to healthy servers when it determines that the original server has failed, as well as application-management operations like deploying, updating, reimaging and scaling out applications. Dividing the datacenter into clusters isolates faults at the FC level, preventing certain classes of errors from affecting servers beyond the cluster in which they occur.

The network management stack 300 includes a network host layer (NHL) 303. The NHL 303 may include network host agent (NHA) 313 at the host level. The NHA 313 may include a plugin loaded on a host. The NHA 313 performs management operations at the host level.

Figure 4:
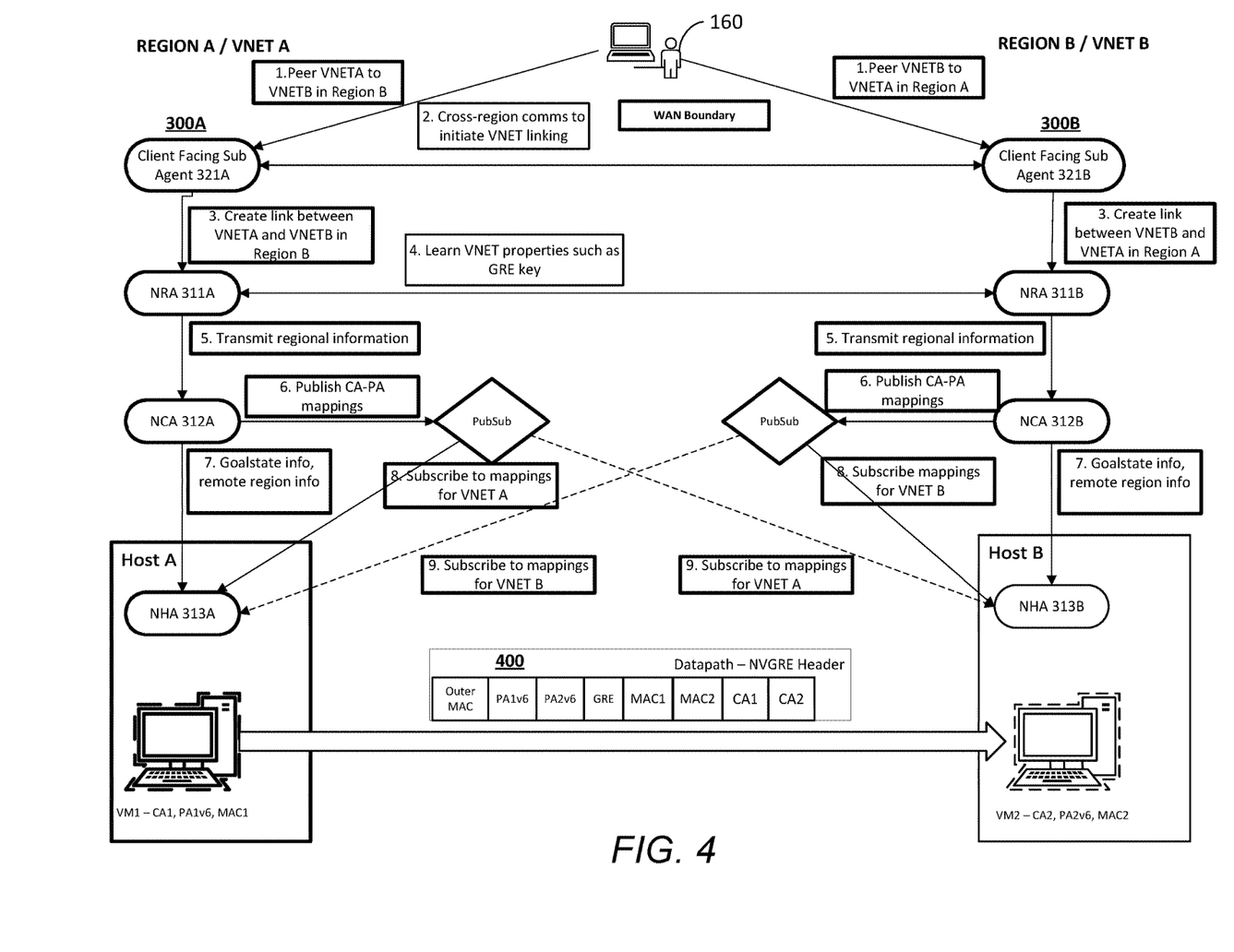
FIG. 4 shows a data flow diagram for global virtual network peering, according to an embodiment.

FIG. 4 shows a data flow diagram for global virtual network peering, according to an embodiment. FIG. 4 shows steps for connecting virtual network A in region A (also shown in FIG. 2) to virtual network B in region B (also shown in FIG. 2) through global virtual network peering. Regions A-B include network stacks 300A-B, respectively, each of which includes the components also shown in FIG. 3. Network management stack 300A in region A includes sub-agent 321A and NRA 311A at the NRL 301; NCA 312A at the NCL 302; and NHA 313A at the NHL 303. Network management stack 300B in region B includes similar components. Regions A and B may be different geographic regions, such as a region in North America and a region in Asia.

Assume that customer 160 wants to connect VNET A and VNET B through global virtual network peering. Customer 160 may be a subscriber to a cloud service provided by a cloud provider which implements data centers A-B in regions A-B, respectively. One example of a cloud service that customer 160 may subscribe to is infrastructure as a service (IaaS). For example, the cloud provider hosts the infrastructure components traditionally present in an on-premises data center, including servers, storage and networking hardware, as well as the virtualization or hypervisor layer. At 1, customer 160 sends a request to the cloud provider, such as through customer portal 350 or API 351 shown in FIG. 3, to connect VNET A and VNET B through global virtual network peering. Client-facing sub-agents 321 A-B at the regional layer receive the request, and upon receiving the request, look up the region information of the specified virtual networks. Also, at 2, the sub-agents 321 A-B initiate linking of the VNETs by sharing information about their respective VNETs. The shared information may include regions IDs, VNET IDs, customer authorizations, etc. Also, each of the sub-agents 321 A-B may confirm if it actually has the VNET to peer, and determines if the VNET is approved for peering. At 3, links are created between the VNETs. For example, each of the sub-agents 321 A-B sends instructions to the respective NRAs 311A-B to peer the VNETs, and along with the instructions, includes the information determined about the other VNET determined from step 2.

At 4, each of the NRAs 311A-B learns properties of the remote virtual network, such as its unique Generic Routing Encapsulation (GRE) key. The properties may be learned by exchanging VNET information with the remote NRA and based on information provided from the sub-agent. The NRAs 311A-B may also perform checks. For example, the customer addresses of VNET subnets being peered should not overlap. If there is overlap, then the customer may be notified and customer addresses (CAs) may be modified as needed.

At 5, the NRAs 311A-B transmit regional information associated with the VNETs A-B to the respective NCAs 312A-B that may be needed for peering the VNETs. This information may include region IDs of the VNETs, VNET IDs, storage that can be accessed by a particular VNET, other properties learned at step 4, etc. This information also includes the information for the remote VNET. After the NCAs 312A-B receive the regional information associated with the VNETs, the NCAs 312A-B may not need to communicate with each other to perform the peering.

Each of the regions A-B may maintain a pub/sub mechanism for determining mappings between the customer address space of the VNET (e.g., comprised of virtual network addresses) and the physical address space (e.g., comprised of physical network addresses). At 6, the NCAs 312A-B publish mappings for the customer addresses of the VNETs to their physical addresses (e.g., IPv6 physical addresses), and the mappings may then be published for the lower layers of the stack, such as NHAs 313A-B, to consume. For example, at steps 8-9, the NHAs 313A-B obtain the mappings for the local and remote VNETs A-B through their subscriptions to local and remote pub/sub mechanisms.

Also, at step 7, the NHAs 313A-B receive, from respective NCAs 312A-B, information, such as goal state for link records of VNETs A-B and remote region information, such as source IPv6 prefixes. Goal state may refer to goal state-based management of the customer's virtual networks, such as goal states for security groups, security rules, public IP addresses, subnet configurations, etc. Furthermore, IPv6 prefixes may be used to uniquely identify a region.

After the NHAs 313A-B receive the information described above, such as with respect to steps 7-9, hosts A-B may communicate through global virtual network peering. For example, NHA 313A determines that VM1 (on host A) has CA1, PA1v6 and MAC1, and also determines that VM2 (on host B) has CA2, PA2v6 and MAC2. This information and the GRE key may be used to generate the encapsulated header 400, which is shown in FIG. 4 as Network Virtualization using Generic Routing Encapsulation (NVGRE) header, for sending packets from VM1 to VM2. NVGRE IPv6 encapsulation may be used because IPv6 addresses may be guaranteed to be unique across regions. For example, IPv6 prefixes are assigned to particular regions to uniquely identify the regions. For example, assume that regions A and B each have a host with the same IP addresses, such as 192.168.1. If virtual network gateways were used to communicate between regions, then the gateways may perform regional filtering to identify which IP address is associated with which region for routing and other network operations. Global virtual network peering enables communication between hosts in different regions without using the gateways. For global virtual network peering, the packets may be sent from VM1 to VM2 without using a virtual network gateway. For example, a packet is sent directly from VM1 to VM2 instead of sending the packet to a gateway of VNET B. Also, in global virtual network peering, region-based packet filtering may be performed by a host receiving packets based on IP prefixes provided in packet headers that uniquely identify a region. For example, global virtual network peering may use IPv6 prefixes in the encapsulated packets to uniquely identify the regions, and use of IPv6 for the global virtual network peering enables technical benefits such as more efficient routing, more efficient packet processing, directed data flows, simplified network configuration, and IP Security (Sec). The header 400 includes an encapsulated packet header using CA, PA and MAC addresses of the VMs and Hosts. In one embodiment, the NVGRE protocol is used for encapsulation. However, any suitable encapsulation protocol may be used that allows tenant VM information, such as a VSID, VM MAC address, and CA to be transmitted in a packet. A host or NVGRE router may perform encapsulation and decapsulation. For NVGRE encapsulation, the header 400 includes an outer MAC and outer IP address. In an example, the outer IP address is IPv6 including IPv6 prefixes that may uniquely identify a region. The outer MACs and outer IP addresses may be addresses for source/destination NVGRE endpoints (e.g., switches or hosts). GRE may include the GRE header. MAC1-2 and CA1-2 are inner MAC and IP addresses. For example, the inner IP addresses include the destination and source CA for the tenant's services, and the inner MAC addresses include the destination and source MAC addresses for the VMs running the tenant's services.

Global virtual network peering enables seamlessly connecting two virtual networks without being susceptible bandwidth constraints or other performance constraints caused by virtual network gateways. Once peered, the virtual networks may appear as one, for connectivity purposes. The traffic between virtual machines in the peered virtual networks may be routed through the cloud provider backbone infrastructure, much like traffic is routed between virtual machines in the same virtual network, through private IP addresses only. The peered virtual networks have non-overlapping IP address spaces. In an example, address ranges cannot be added to or deleted from the address space of a virtual network once a virtual network is peered with another virtual network. If a customer needs to add address ranges to the address space of a peered virtual network, peering is first removed, and then the addresses are added to the address space, and then the global virtual network peering is performed again. Also, virtual networks that exist in two different subscriptions may be peered, as long a privileged user (see specific permissions) of both subscriptions authorizes the peering, and the subscriptions are associated to the same active directory tenant.

Figure 5:
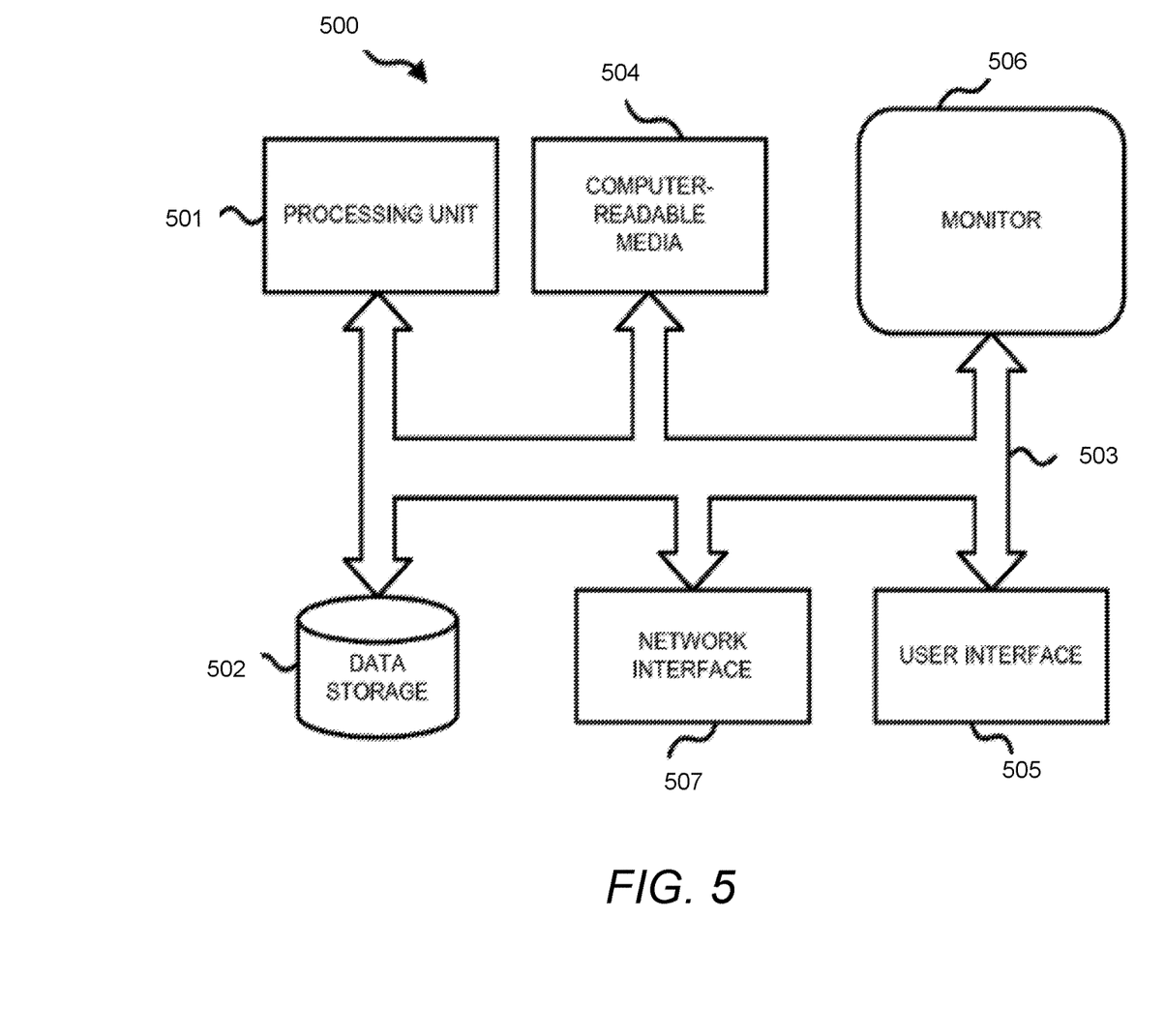
FIG. 5 shows an example of a computing and networking environment, according to an embodiment.

FIG. 5 shows an example of a suitable computing and networking environment on which the examples and embodiments described above may be implemented. The computing system environment is only one example of a suitable computing environment and is not intended to suggest any limitation as to the scope of use or functionality of the examples and embodiments described above. The examples and embodiments described above is operational with numerous other general purpose or special purpose computing system environments or configurations. Examples of well-known computing systems, environments, and/or configurations that may be suitable for use with the examples and embodiments described above include, but are not limited to: personal computers, server computers, handheld or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The examples and embodiments described above may be described in the general context of computer-executable instructions, such as program modules, being executed by a computer. Generally, program modules include routines, programs, objects, components, data structures, and so forth, which perform particular tasks or implement particular abstract data types. The examples and embodiments described above may also be practiced in distributed computing environments where tasks are performed by remote processing devices that are linked through a communications network. In a distributed computing environment, program modules may be located in local and/or remote computer storage media including memory storage devices.

FIG. 5 shows an example of a system for implementing various aspects of the example and embodiments described herein and may include a computing device in the form of a computer 500. Components may include, but are not limited to, various hardware components, such as processing unit 501, data storage 502, such as a system memory, and system bus 503 that couples various system components including the data storage 502 to the processing unit 501. The system bus 503 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 500 typically includes a variety of non-transitory computer-readable media 504. Computer-readable media 504 may be any available media that can be accessed by the computer 500 and includes both volatile and non-volatile media, and removable and non-removable media, but excludes propagated signals. By way of example, and not limitation, computer-readable media 504 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 500. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 502 includes computer storage media in the form of volatile and/or nonvolatile memory such as read only memory (ROM) and random access memory (RAM). A basic input/output system (BIOS), containing the basic routines that help to transfer information between elements within computer 500, such as during start-up, is typically stored in ROM. RAM typically contains data and/or program modules that are immediately accessible to and/or presently being operated on by processing unit 501. By way of example, and not limitation, data storage 502 holds an operating system, application programs, and other program modules and program data.

Data storage 502 may also include other removable/non-removable, volatile/nonvolatile computer storage media. By way of example only, data storage 502 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 5, provide storage of computer-readable instructions, data structures, program modules and other data for the computer 500.

A user may enter commands and information through a user interface 505 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 501 through a user input interface 505 that is coupled to the system bus 503, but may be connected by other interface and bus structures, such as a parallel port, game port or a universal serial bus (USB). A monitor 506 or other type of display device is also connected to the system bus 503 via an interface, such as a video interface. The monitor 506 may also be integrated with a touch-screen panel or the like. Note that the monitor and/or touch screen panel can be physically coupled to a housing in which the computing device 500 is incorporated, such as in a tablet-type personal computer. In addition, computers such as the computing device 500 may also include other peripheral output devices such as speakers and printer, which may be connected through an output peripheral interface or the like.

The computer 500 may operate in a networked or cloud-computing environment using logical connections to one or more remote devices, such as a remote computer. The remote computer may be a personal computer, a server, a router, a network PC, a peer device or other common network node, and typically includes many or all of the elements described above relative to the computer 500. The logical connections depicted in FIG. 5 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 500 may be connected to a public or private network through a network interface or adapter 507. In some embodiments, a modem or other means for establishing communications over the network. The modem, which may be internal or external, may be connected to the system bus 503 via the network interface 507 or other appropriate mechanism. A wireless networking component such as comprising an interface and antenna may be coupled through a suitable device such as an access point or peer computer to a network. In a networked environment, program modules depicted relative to the computer 500, or portions thereof, may be stored in the remote memory storage device. It may be appreciated that the network connections shown are exemplary and other means of establishing a communications link between the computers may be used.

The computer 500 may be a server or another type of computer. The computer 500 may include a platform for hosting one or more components of the network management stack 300 shown in FIGS. 3-4. In an example, components of the network management stack 300 may be hosted on multiple computers including the components of the computer 500. In an example, agents 311-313 may be hosted on different computers. For example, the computer 500 may include a virtual network management device executing agent 313, such as hosts A or B shown in FIG. 4. The virtual network management device may communicate with other computers, including a computer that may execute agent 312. The agents 311-313 and other agents described herein, including agents of the network management stack 300, may include machine-readable instructions stored on a non-transitory computer readable medium and executed by processors on their respective computers.

Figure 6:
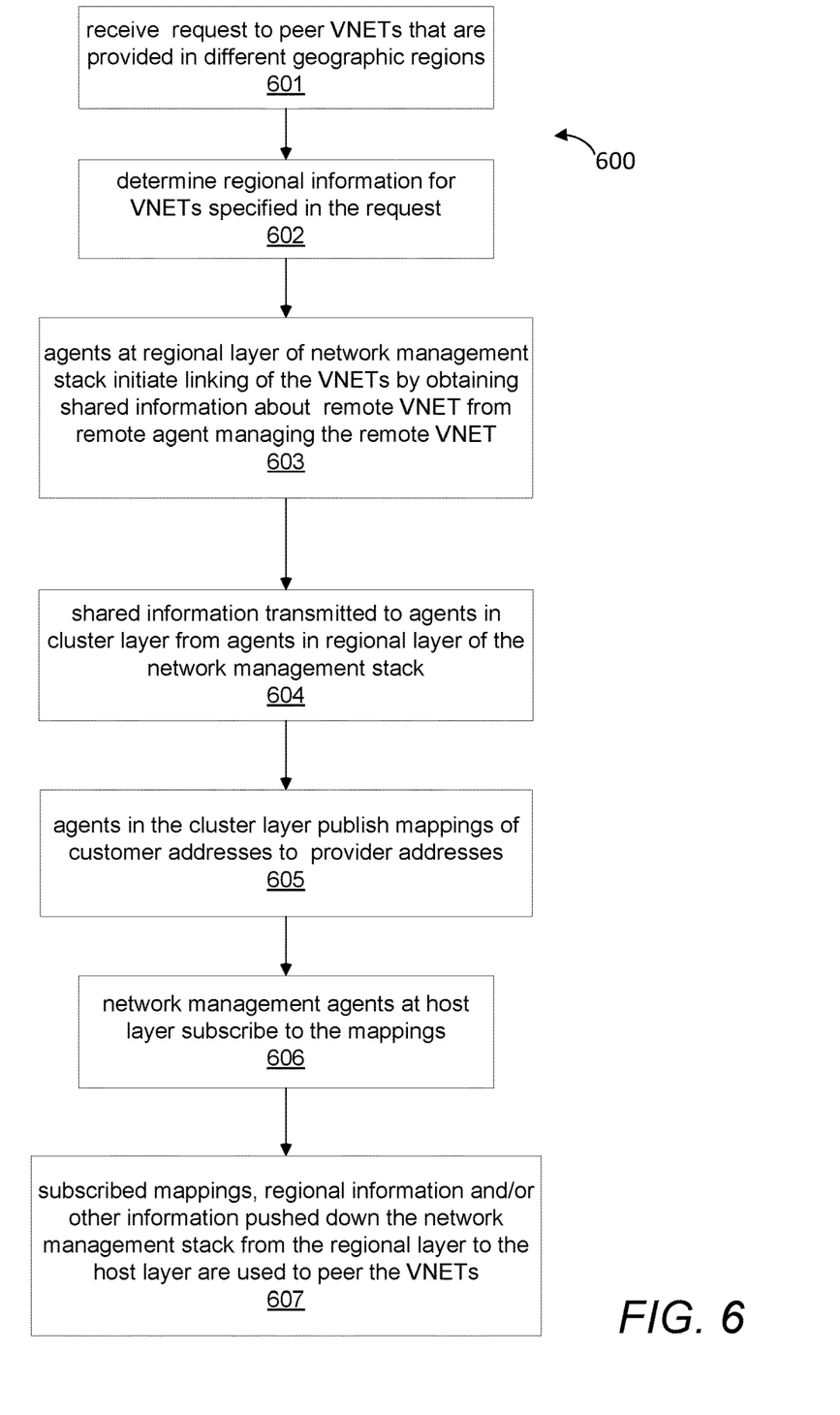
FIG. 6 shows a method for pushing information down a network management stack of a cloud provider to facilitate global virtual network peering of virtual networks that may be located in different geographic regions

FIG. 6 shows a method 600 for pushing information down a network management stack of a cloud provider to facilitate global virtual network peering of virtual networks that may be located in different geographic regions. FIG. 6 is described by way of example as being performed by network management agents in the network management stack 300 shown in FIGS. 3 and 4. The network management agents may include machine-readable instructions executed by one or more computers. The method 600 may be performed by one or more computers, such as the computer shown in FIG. 5.

At 601, a cloud provider receives a request from a customer to peer virtual networks that are provided in different geographic regions. For example, the cloud provider receives a request to peer VNETs A-B via customer portal 350 or API 351 shown in FIG. 3.

At 602, the cloud provider determines regional information for virtual networks specified in the request. The regional information may include a region ID and other regional information for the virtual networks. A virtual network for a customer may be created in a particular region, and an agent may associate and store a VNET ID and region ID (e.g., a region name) for a virtual network created in a particular region. Also, the agent may store a source IPv6 prefix for the region. For example, IPv6 prefixes are used to uniquely identify the regions of the cloud provider.

In an example, a network management agent of the cloud provider may determine the regions of the virtual networks. For example, a network management agent in the network regional layer 301 of the network management stack 300, e.g., client-facing sub-agents 321 A-B shown in FIG. 4, may determine the regions of the virtual networks specified in the request. Information identifying the region that a virtual network is located may be stored in a data storage device accessible by the network management agent. In another example, a network management agent in a global layer, which has a global view of the customer's virtual networks, determines the regions of the virtual networks specified in the request.

In the example shown in FIG. 4, sub-agents 321A-B receive the request for peering VNETs A-B, and determine whether the customer 160 actually has the VNETs to peer, and whether the VNETs are approved for peering. Assuming VNETs A-B are assigned to the customer 160 and are determined to be approved for peering and are determined to be in different regions, then the cloud provider initiates global virtual network peering of VNETs A-B.

At 603, agents at the regional layer 301 of the network management stack initiate linking of the VNETs specified in the request, for example, by obtaining shared information about the remote VNET from the remote agent managing the remote VNET. For example, the NRAs 311A-B share information about their VNETs, such as regions IDs, VNET IDs, etc. Also, the shared information may include properties of the remote virtual network, such as the GRE key of the remote VNET. Also, the information shared between the NRAs 311A-B may include instructions to peer the VNETs A-B through global virtual network peering.

At 604, the shared information, including GRE keys, VNET IDs, etc., is transmitted to agents in the cluster layer 302 from agents in the regional layer 301. For example, the NRAs 311A-B transmit the shared information associated with the VNETs A-B to the respective NCAs 312A-B. This information includes the information for the remote VNET.

At 605, the agents in the cluster layer publish mappings of the customer addresses to the provider addresses, which can be consumed by the agents in the host layer 303. For example, each of NCAs 312A-B determine the mappings for their VNET based on the VNET ID of their VNET, and the mappings are published for the lower layers of the stack, such as NHAs 313A-B, to consume. In an example, the cloud provider may maintain a Virtual Network Directory Service that maintains the mappings from customer IP address space to provider IP address space. Agents may publish the mappings to the Service or subscribe to the mappings from the Service.

At 606, the network management agents, e.g., NHAs 313A-B, at the host layer 303 subscribe to the mappings of the local VNET and the remote VNET. The subscribed mappings may be cached by a host of a VM.

At 607, the subscribed mappings, regional information and/or other information pushed down the network management stack 300, such as IPv6 prefixes, VNET IDs, subnet IDs, etc., from the regional layer to the host layer, are used to peer the VNETs A-B so VMs in the VNETs can communicate directly without going through a virtual network gateway for any of the regions A-B. For example, the VMs 1-2 shown in FIG. 4 can communicate using NVGRE IPv4 in IPv6 encapsulation. Also, through the use of IPv6 prefixes to uniquely identify regions, IPv6 addresses are guaranteed to be unique across regions, unlike IPv4.

For the global virtual network peering of the VNETs A-B, VMs in the VNETs communicate via encapsulated packets that include the regional information and information determined from the mapping subscriptions in the header. An example of the encapsulated packet is shown as 400 in FIG. 4 which includes an encapsulated packet header using the CA, PA and MAC addresses of the VMs and Hosts. In one embodiment, the GRE protocol is used for encapsulation. However, any suitable encapsulation protocol may be used that allows tenant VM information, such as a VM MAC address, and CA to be transmitted in a packet.

In an example, a software agent in a host in the host layer 303 may perform encapsulation and decapsulation. For example, referring to FIG. 4, NHA 313A may create the packet with NVGRE header 400 to send from VM1 to VM2. GRE encapsulation, or any other encapsulation, includes mapping and encapsulates a tenant/customer IP address (i.e., CA) to an IP address in the cloud provider address space. Also, an agent or router or virtual router that may be in the host layer can perform regional packet filtering based on the unique regional IDs (e.g., IPv6 prefixes). For example, a virtual router at a host may filter or discard packets that don't have a predetermined source or destination unique regional ID.

Embodiments and examples are described above, and those skilled in the art will be able to make various modifications to the described embodiments and examples without departing from the scope of the embodiments and examples.

What is claimed is:

1. A virtual network management device operable to implement peering of virtual networks of a cloud provider, the virtual network management device implemented on a computing device comprising:
   a memory containing machine-readable instructions; and
   a processor that, when executing the machine-readable instructions, causes the virtual network management device to perform operations comprising:
   determine, by a regional layer of a hierarchical network management stack, unique regional identifiers for first and second geographical regions of the cloud provider, the regional layer configured to manage network resources for virtual networks hosting the first and second geographic regions of the cloud provider, the unique regional identifiers determined based on regional information for the virtual networks passed from the hierarchical network management stack;
   generate an encapsulated packet for transmission from a first virtual machine (VM) in a first one of the virtual networks located in the first geographical region to a second VM in a second one of the virtual networks located in the second geographical region,
   wherein the encapsulated packet includes a header comprising the unique regional identifiers for the first and second geographical regions, virtual network addresses of the first and second VMs, and physical network addresses of the first and second VMs; and
   route the encapsulated packet from the first virtual network to the second virtual network based on the unique regional identifiers.

2. The virtual network management device of claim 1, wherein the unique regional identifiers for the first and second geographical regions comprise Internet Protocol version six prefixes that uniquely identify each of the first and second geographical regions.

3. The virtual network management device of claim 2, wherein region-based packet filtering is performed based on at least one of the Internet Protocol version six prefixes.

4. The virtual network management device of claim 1, wherein the encapsulated packet comprises a Network Virtualization Using Generic Routing Encapsulation header.

5. The virtual network management device of claim 1, wherein the first and second VMs have non-overlapping customer address spaces.

6. The virtual network management device of claim 1, wherein the first VM transmits the packet directly to the second VM without traversing a virtual network gateway for the first or second virtual networks.

7. The virtual network management device of claim 1, wherein the hierarchical stack comprises the regional layer, a cluster layer and a host layer configured to perform network management operations for the geographical regions, clusters of the network, and hosts of the network, respectively.

8. The virtual network management device of claim 7, wherein network management agents at the cluster layer publish mappings of customer addresses of virtual machines in a customer address space of the customer of the cloud provider to physical addresses of host machines in a provider address space of the cloud provider.

9. The virtual network management device of claim 8, wherein a host network management agent at the host layer subscribes to the mappings to generate the encapsulated packet.

10. A computer-implemented method for peering virtual networks, the method comprising:
 determining, by a regional layer of a hierarchical network management stack, unique regional identifiers for first and second geographical regions of a cloud provider, the regional layer configured to manage network resources for virtual networks hosting the first and second geographic regions of the cloud provider, the unique regional identifiers determined based on regional information for the virtual networks passed from the hierarchical network management stack;
 generating an encapsulated packet for transmission from a first virtual machine (VM) in the first virtual network to a second VM in the second virtual network,
 wherein the encapsulated packet includes a header comprising the unique regional identifiers for the first and second geographical regions, virtual network addresses of the first and second VMs, and provider network addresses of the first and second VMs; and
 routing the encapsulated packet from the first virtual network to the second virtual network based on the unique regional identifiers.

11. The method of claim 10, wherein the unique regional identifiers for the first and second geographical regions comprise Internet Protocol version 6 prefixes that uniquely identify each of the first and second geographical regions.

12. The method of claim 11, wherein region-based packet filtering is performed based on at least one of the Internet Protocol version 6 prefixes.

13. The method of claim 10, wherein the encapsulated packet comprises a Network Virtualization Using Generic Routing Encapsulation header.

14. The method of claim 10, wherein the first and second VMs have non-overlapping customer address spaces.

15. The method of claim 10, further comprising:
 transmitting the packet from the first VM directly to the second VM without traversing a virtual network gateway for the first or second virtual networks.

16. The method of claim 10, wherein:
 the hierarchical network management stack comprises the regional layer, a cluster layer and a host layer to perform network management operations for the geographical regions of the cloud provider, clusters of the cloud provider, and hosts of the cloud provider; and
 the unique regional identifiers for the first and second geographical regions are passed down from the regional layer to the host layer via the cluster layer.

17. The method of claim 16, further comprising:
 publishing mappings by network management agents at the cluster layer, wherein the mappings map customer addresses of virtual machines in a customer address space of the customer of the cloud provider to provider addresses of host machines in a provider address space of the cloud provider.

18. The method of claim 17, further comprising:
 a host network management agent at the host layer subscribing to the mappings to generate the encapsulated packet.

19. One or more non-transitory computer-readable media devices having computer-executable instructions embodied thereon, wherein the instructions are executed by at least one processor to:
 determine, by a regional layer of a hierarchical network management stack, unique regional identifiers for first and second geographical regions of a cloud provider, the regional layer configured to manage network resources for virtual networks hosting the first and second geographic regions of the cloud provider, the unique regional identifiers determined based on regional information for the virtual networks passed from the hierarchical network management stack;
 subscribe to mappings of addresses in a customer address space of the customer to a provider address space of the cloud provider;
 generate an encapsulated packet for transmission from a first virtual machine (VM) in the first virtual network to a second VM in the second virtual network based on the unique regional identifiers for the first and second geographical regions and the subscribed mappings; and
 route the encapsulated packet from the first virtual network to the second virtual network based on the unique regional identifiers.

20. The one or more non-transitory computer-readable media devices of claim 19, wherein the hierarchical network management stack comprises the regional layer, a cluster layer and a host layer to perform network management operations for the geographical regions, clusters, and hosts, and
 the unique regional identifiers for the first and second geographical regions are passed down from the regional layer to the host layer.

* * * * *